United States Patent
Ramanath et al.

(10) Patent No.: US 12,109,892 B2
(45) Date of Patent: Oct. 8, 2024

(54) PERSONAL MOBILITY VEHICLE

(71) Applicant: Rajeev Ramanath, San Jose, CA (US)

(72) Inventors: Rajeev Ramanath, San Jose, CA (US); Julio Cesar Castañeda, Winter Park, FL (US)

(*) Notice: Subject to any disclaimer, the term of this patent is extended or adjusted under 35 U.S.C. 154(b) by 404 days.

(21) Appl. No.: 17/484,450

(22) Filed: Sep. 24, 2021

(65) Prior Publication Data

US 2022/0097532 A1     Mar. 31, 2022

Related U.S. Application Data

(60) Provisional application No. 63/083,147, filed on Sep. 25, 2020.

(51) Int. Cl.
*B60L 15/20*     (2006.01)
*A61G 5/04*      (2013.01)
(Continued)

(52) U.S. Cl.
CPC ............... *B60L 15/20* (2013.01); *A61G 5/04* (2013.01); *A61G 5/045* (2013.01); *A61G 5/0875* (2016.11); *A61G 5/125* (2016.11); *B62K 5/007* (2013.01); *B62K 5/025* (2013.01); *A61G 2203/20* (2013.01); *A61G 2203/22* (2013.01); *A61G 2203/34* (2013.01); *A61G 2203/40* (2013.01); *A61G 2203/44* (2013.01);
(Continued)

(58) Field of Classification Search
CPC .......... A61G 5/04; A61G 5/045; A61G 5/007; B62K 5/007; B62K 5/025; B62K 2015/001

See application file for complete search history.

(56) References Cited

U.S. PATENT DOCUMENTS

| | | | | |
|---|---|---|---|---|
| 5,036,938 A | * | 8/1991 | Blount ................... | B62D 61/08 180/68.5 |
| 6,056,077 A | * | 5/2000 | Kobayashi ............. | B62K 5/007 280/786 |

(Continued)

FOREIGN PATENT DOCUMENTS

| | | | |
|---|---|---|---|
| JP | 2011105157 A | * | 6/2011 |
| KR | 20190089539 A | * | 7/2019 |

*Primary Examiner* — Emma K Frick

(57) ABSTRACT

A personal mobility vehicle 1 includes one or more automation components, a vault 2, and locking means 3 adapted to lock the vault 2. The automation components include at least one of a motor controller, computing processors, or a battery to power other automation components, or combination thereof. The functional components are the components that either display various information related to navigation of the vehicle, or receive inputs to be processed by the computing processor or microcontroller, or receives triggers from the motor controller or the computing processor regarding the functioning of the functional components, or combination thereof. Inside the vault 2, the automation components are placed, such that the automation components are functionally connected to other functional components of the vehicle 1. The embodiment helps to safeguard the automation components, and keep them protected, such that authorized personnel have access to the automation components inside the vault. These automation components are critical to functioning of the vehicle 1.

18 Claims, 3 Drawing Sheets

(51) Int. Cl.
*A61G 5/08* (2006.01)
*A61G 5/12* (2006.01)
*B62K 5/007* (2013.01)
*B62K 5/025* (2013.01)
*B62K 15/00* (2006.01)

(52) U.S. Cl.
CPC .... *A61G 2203/72* (2013.01); *A61G 2203/726* (2013.01); *B60L 2200/24* (2013.01); *B60L 2250/16* (2013.01); *B62K 2015/001* (2013.01)

(56) References Cited

U.S. PATENT DOCUMENTS

| | | | | |
|---|---|---|---|---|
| 6,095,270 | A * | 8/2000 | Ishikawa | B62H 5/00 |
| | | | | 180/68.5 |
| 6,312,035 | B1 * | 11/2001 | Aoki | B62J 43/16 |
| | | | | 16/361 |
| 6,457,544 | B1 * | 10/2002 | Sung | B62K 3/002 |
| | | | | 280/282 |
| 7,654,356 | B2 * | 2/2010 | Wu | B62K 15/008 |
| | | | | 296/181.7 |
| 8,267,210 | B2 * | 9/2012 | Jones | H01M 50/249 |
| | | | | 180/68.5 |
| 10,766,506 | B2 * | 9/2020 | Huck | B61D 49/00 |
| 10,945,900 | B1 * | 3/2021 | Ousborne | A61G 5/1005 |
| 11,000,432 | B2 * | 5/2021 | Katsura | B62B 5/087 |
| D926,087 | S * | 7/2021 | Tsukamoto | D12/131 |
| 11,267,388 | B2 * | 3/2022 | Raja | A61G 5/0833 |
| 11,324,649 | B2 * | 5/2022 | Van De Kieft | A61G 5/125 |
| 11,511,564 | B2 * | 11/2022 | Hirata | A61G 5/1078 |
| 11,534,350 | B2 * | 12/2022 | Raja | A61G 5/1091 |
| 11,607,354 | B2 * | 3/2023 | Penski | A61G 5/047 |
| D996,304 | S * | 8/2023 | Hernandez | D12/131 |
| 11,793,696 | B2 * | 10/2023 | Son | A61G 5/128 |
| 11,951,941 | B2 * | 4/2024 | Rathi | G07C 9/32 |
| 2006/0087279 | A1 * | 4/2006 | Chen | B60L 50/64 |
| | | | | 320/104 |
| 2013/0192908 | A1 * | 8/2013 | Schlagheck | B62K 3/002 |
| | | | | 180/65.1 |
| 2019/0056745 | A1 * | 2/2019 | Meehan | B62K 5/08 |
| 2021/0085541 | A1 * | 3/2021 | Takei | A61G 5/125 |
| 2021/0145670 | A1 * | 5/2021 | Son | A47C 1/024 |
| 2021/0212871 | A1 * | 7/2021 | Klein | A61G 5/1048 |
| 2022/0087884 | A1 * | 3/2022 | Takei | A61G 5/128 |
| 2022/0099831 | A1 * | 3/2022 | Ramanath | G01S 17/89 |

\* cited by examiner

PERSONAL MOBILITY VEHICLE

FIELD OF INVENTION

The present invention relates to a personal mobility vehicle. More specifically, the invention relates to a personal mobility vehicle that has the means to be autonomous, as well as, means to be driven through manual input, and also is enabled to carry luggage, and is further enabled to traverse in an indoor environment like an Airport.

BACKGROUND OF INVENTION

Indoor environments like Airports are quite large and require accommodations for transporting people inside the Airport, especially for people who are old, have limited or restricted mobility or are disabled. Many times, there are battery-driven cars that can take a group of people on it, and are driven by a driver. However, such an arrangement has challenges, as Airports are large, and have multiple gates, and the people on the car may have destinations in different directions. Additionally, time is of the essence for passengers in an Airport. Carrying multiple people together, who have to go to different gates, may take more time, and can create issues for passengers that are time-constrained.

To handle such challenges, a personal mobility vehicle, like a wheelchair is required, which can be self-driven by the passenger or traveler themselves. Also, given that generally, passengers travel with one or two hand baggages, such a vehicle should also provide appropriate space for transporting luggage.

Additionally, the challenge shall be in driving such a wheelchair or vehicle. To drive such vehicles takes skill that requires time to develop. It can be challenging for a novice user and there is a high probability that due to a lack of skill to drive the vehicle, the vehicle might collide with an obstacle. Even after appropriate time with the vehicle, the vehicle may be required to be driven in a challenging environment, either due to the layout of the airport or the congestion involved. The environment may have multiple moving obstacles, obstacles that are narrowly spaced with respect to each other, etc. These environments pose challenges to even skilled drivers, as the driver may have a perception for the obstacle which may not be appropriate, and which may result in the driver colliding with the obstacle.

Another challenge is with respect to protection and management of the computation and automation resources like motor controller, computer processing unit, battery, etc. For proper functioning of the personal mobility vehicle, these resources should be safeguarded and protected.

Hence, a personal mobility vehicle or a wheelchair is desired that shall be able to overcome the above mentioned challenges related to a personal mobility vehicle in an indoor environment, like an Airport.

OBJECTIVE OF INVENTION

The object of the invention is to provide a wheelchair that is enabled to overcome challenges of indoor environment in public places like an Airport.

SUMMARY OF INVENTION

The objective of the invention is achieved by a personal mobility vehicle of claim 1.

The personal mobility vehicle includes one or more automation components, a vault, and a locking mechanism adapted to secure the vault. The automation components include at least one of a motor controller, computing processors, or a battery to power other automation components, or a combination thereof. The functional components are the components that either display various information related to navigation of the vehicle, or receive inputs to be processed by the computing processor or microcontroller, or receives triggers from the motor controller or the computing processor regarding the functioning of the functional components, or combination thereof. Inside the vault, the automation components are placed such that the automation components are functionally connected to other functional components of the vehicle. The embodiment helps to safeguard the automation components, and keep them protected, such that only authorized personnel have access to the automation components inside the vault. These automation components are critical to the functioning of the vehicle.

According to one embodiment of the personal mobility vehicle, wherein the vault is located underneath a seat. Such a placement helps to keep the vault away from direct sight of the commuters or any other person looking at the vehicle. Such concealed placement further helps in keeping the automation components safe and protected.

According to another embodiment of the personal mobility vehicle includes a base frame onto which two or more wheels of the vehicles are assembled, wherein the base frame further includes a base portion and an extending portion extending from the base portion, such that a part of the extending portion and a cover forms the vault. This embodiment further enhances aesthetic concealment of the vault, and further keeps the automation component protected.

According to yet another embodiment of the personal mobility vehicle, wherein the extending portion has a seat fixture utility through which the seat is affixed, the seat fixture utility is provided above the vault. Such placement of the seat further helps to keep the vault away from direct sight of the commuters, and thus helps in keeping the automation components safe and protected.

According to one embodiment of the personal mobility, wherein the base frame has an extended front portion, wherein one or more base plates can be assembled, such that a part of the extended front portion is lying beneath the seat and is adapted to be used as a first luggage compartment. Such structural placement of the first luggage compartment provides sufficient space for placing large luggage behind the legs of the user of the vehicle when the user is seated on the seat of the vehicle.

According to another embodiment of the personal mobility vehicle, wherein the extended front portion includes a set of first sensors placed onto a front side, and adapted to sense the distance to obstacles during forward movement of the vehicle and to generate the distance data and adapted to send it to the computing processor or motor controller or both. Such placement of sensors helps to keep the sensors away from any obstructions created by body movements of the user of the vehicle when the user of the vehicle is seated onto the vehicle.

According to yet another embodiment of the personal mobility vehicle, wherein at least one of the set of front sensors are placed toward sides of the extended front portion in proximity to the front side. Such placement provides better coverage of the environment around the vehicle, especially towards the front side. While the vehicle is moving in the forward direction, such placement of sensors keeps the vehicle aware of obstacles that are located to the sides of the vehicle.

According to one embodiment of the personal mobility vehicle, wherein the base frame has a second luggage compartment towards the rear. Such an additional luggage compartment is further helpful, as many times commuters in Airports have more than one carry-on luggage, and with this luggage compartment present, they need not rely on additional means to transport their luggage.

According to another embodiment of the personal mobility vehicle, wherein the second luggage compartment comprises a set of rear sensors placed towards the rear of the vehicle, and adapted to sense the distance to obstacles during backward movement of the vehicle and to generate the distance data and adapted to send it to the computing processor or motor controller or both.

According to yet another embodiment of the personal mobility vehicle, wherein at least one of the set of rear sensors are placed toward the sides of the second luggage compartment. Such a placement provides better coverage of the environment around the vehicle, especially towards the rear While the vehicle is moving in the backward direction, such placement of sensors keeps the vehicle aware of obstacles that are placed to the side of the vehicle.

According to one embodiment of the personal mobility vehicle, the vehicle includes a handlebar frame connected to the extended frame, and has a backrest assembly through which a backrest is mechanically coupled. Such division of frame of the vehicle, helps in transportation as the vehicle can be transported in a compact form factor. Also, during maintenance of the vehicle, only part of the vehicle is to be disassembled, and if the replacement is required, only part of the vehicle frame is required to be replaced.

According to yet another embodiment of the personal mobility vehicle, wherein the handlebar frame further comprises one or more armrest assemblies through which one or more armrests are mechanically coupled. Armrests help in the ergonomic placement of the arms onto the vehicle.

According to one embodiment of the personal mobility vehicle, wherein one of the armrests is adapted to swivel. Swiveling of the armrest helps in displacement of the armrest during ingress and egress from the seat of the vehicle.

According to another embodiment of the personal mobility vehicle, the vehicle includes an interactive display mechanically coupled to one of the armrests, and functionally coupled to one or more of the automation components placed inside the vault to receive one or more data, and either, to show the data onto the display, or, to process the data and to show the processed data onto the display, or, to receive a display input from an input module associated with the display and to process the data based on the received display input and to show the processed data onto the display. Such an interactive display is helpful in keeping the user of the vehicle informed about the environment in which they are traveling.

According to yet another embodiment of the personal mobility vehicle, the vehicle includes an emergency button mechanically coupled to one of the armrests, functionally coupled to the computing processor or the motor controller, or both, and sends a stop input to the computing processor or the motor controller, or both, such that either the computing processor or the motor controller processes the stop input to stop the vehicle. Such placement of an emergency button makes it easily accessible to the user of the vehicle. Also, by providing an emergency button, a vehicle can be easily stopped, which is helpful when automation components of the vehicle may malfunction or have functioned according to some false positives or true negatives.

According to one embodiment of the personal mobility vehicle, the vehicle includes a control input module which is enabled to receive control input related to at least direction of movement of the vehicle, speed of movement of the vehicle, braking of vehicle or combination thereof, and sends the control input to the computing processor or the motor controller, or both, such that either the computing processor or the motor controller processes the control input to control the movement of the vehicle. Such provisions of control help to provide the means for relevant human interventions required when the vehicle is working in the automation or semi-automation mode.

According to another embodiment of the personal mobility vehicle, the vehicle includes an extended sensor mechanically coupled to the vehicle such that to be placed above the head of a person sitting onto the seat of the vehicle and captures an all-around view of the environment in which the vehicle is placed, and sends the captured view to the computing processor or the motor controller, or both. This helps the automation components to be aware of a wider area of the environment in which it is placed or moving.

According to yet another embodiment of the personal mobility vehicle, the vehicle includes a seat belt sensor and a seating sensor. The seat belt sensor senses the engagement of the seat belt on the vehicle and generates and sends a wearing input to the computing processor or the motor controller, or both. The seating sensor senses the seating of a person onto the seat, and generates and sends a seating input tothe computing processor or the motor controller, or both. Either the computing processor or the motor controller receives and processes the wearing input and the seating input to control the movement of the vehicle. This embodiment helps in keeping the commuter using the vehicle safe by making the vehicle not move until the person is properly seated on the vehicle.

According to yet another embodiment of the personal mobility vehicle, wherein the locking means is adapted to be a combination of one or more of the following:
a mechanical lock operable by mechanical key,
an electronic lock operable by electronic key, or
a biometric lock operable by biometrics of authorized personnel.

Figure 1:
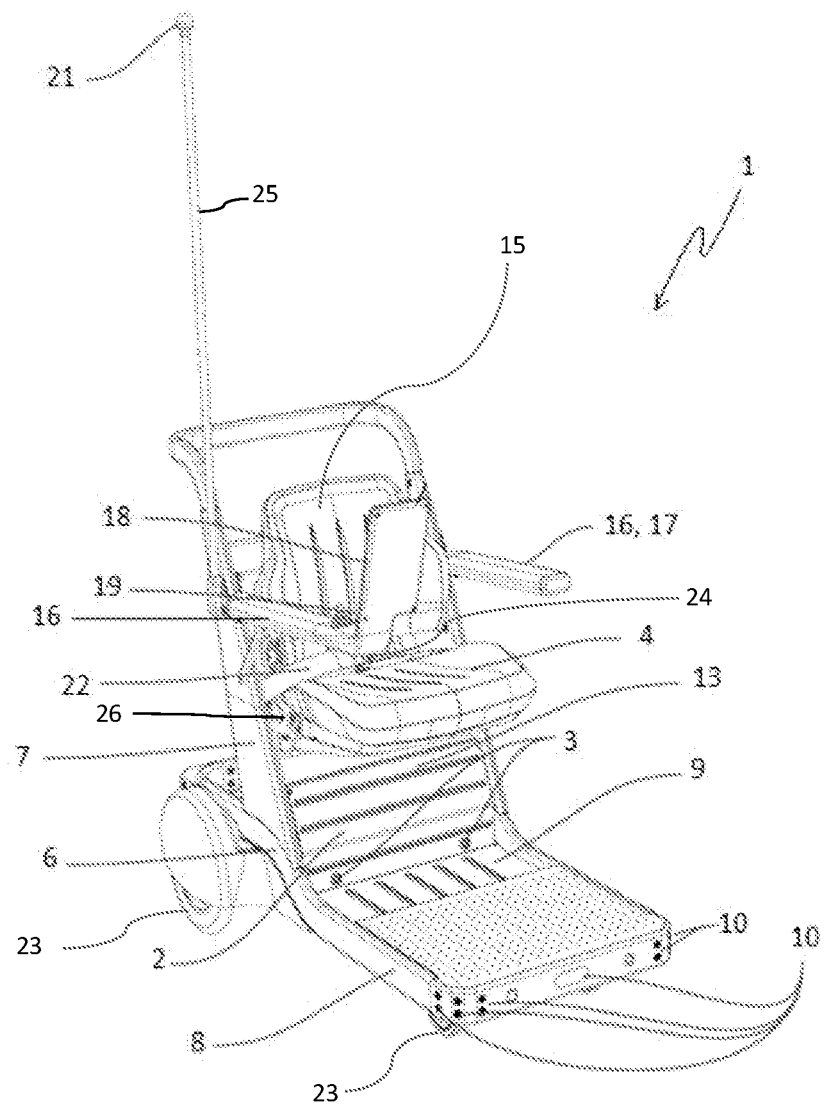
FIG. 1 illustrates a front perspective view of a wheelchair, as per one embodiment of the invention.

The figures depict embodiments of the disclosure for purposes of illustration only. One skilled in the art will readily recognize from the following description that alternative embodiments illustrated herein may be employed without departing from the principles of the disclosure described herein.

DETAILED DESCRIPTION

The best and other modes for carrying out the present invention are presented in terms of the embodiments, herein depicted in the drawings provided. The embodiments are described herein for illustrative purposes and are subject to many variations. It is understood that various omissions and substitutions of equivalents are contemplated as circumstances may suggest or render expedient, but are intended to cover the application or implementation without departing from the spirit or scope of the present invention. Further, it is to be understood that the phraseology and terminology employed herein are for the purpose of the description and should not be regarded as limiting. Any heading utilized within this description is for convenience only and has no legal or limiting effect.

The terms "a" and "an" herein do not denote a limitation of quantity, but rather denote the presence of at least one of the referenced items.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more sub-systems or elements or structures or components preceded by "comprises . . . a" does not, without more constraints, preclude the existence of other, sub-systems, elements, structures, components, additional sub-systems, additional elements, additional structures or additional components. Appearances of the phrase "in an embodiment", "in another embodiment" and similar language throughout this specification may, but not necessarily do, all refer to the same embodiment.

Figure 2:
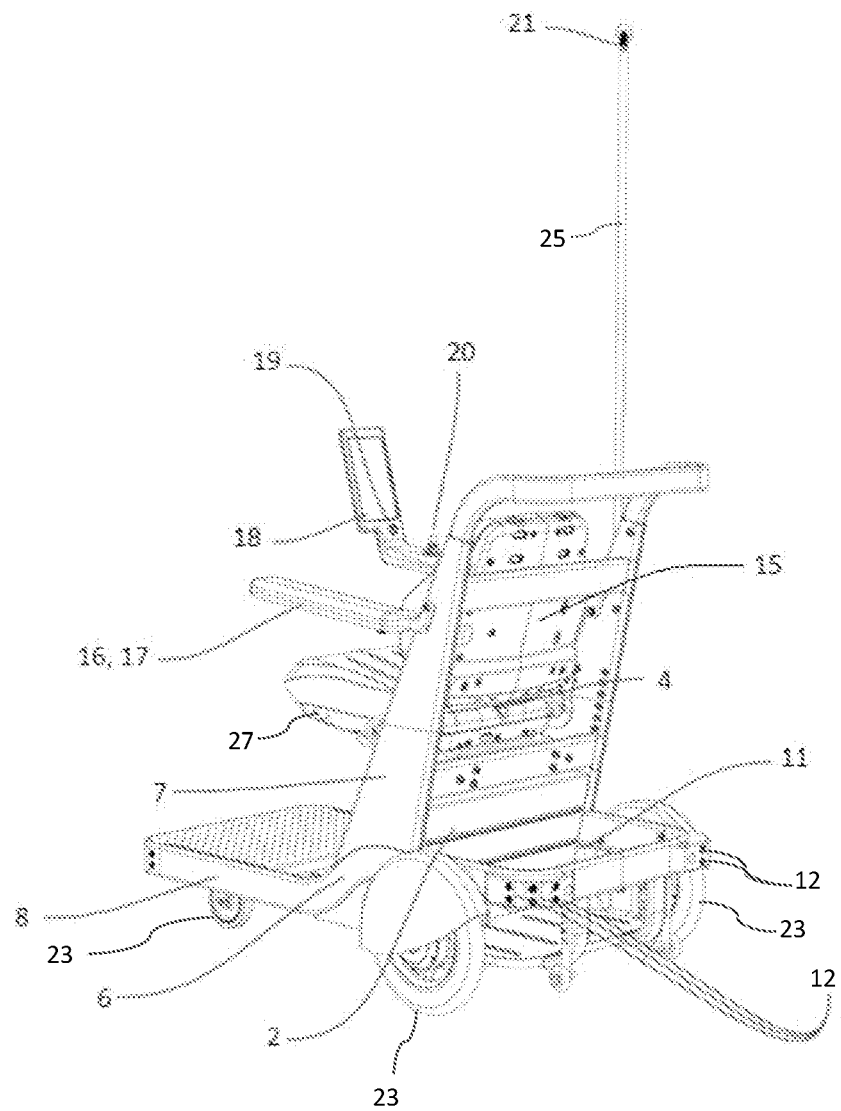
FIG. 2 illustrates a back perspective view of the wheelchair.

FIGS. 1 and 2 shows the front perspective view and back perspective view respectively of an exemplary powered personal mobility vehicle 1. As shown in figures, the vehicle 1 is provided with various sensors 10, 12, 21, a vault 2, a first luggage compartment 9, a second storage compartment 11, seatbelt 22, interactive display 18, Emergency button 19, and Swivel armrest 17.

The vault 2 stores the automation components (not shown in the figures) placed inside it, such that the automation components are functionally connected to other functional components of the vehicle 1. The functional components are the components that either displays various information related to navigation of the vehicle, or receives inputs to be processed by the computing processor or microcontroller, or receives triggers from the motor controller or the computing processor regarding the functioning of the functional components, or any combination of such components.

The automation components placed inside the vault 2 can be a motor controller, computing processors, or a battery to power other automation components, or any combination of them. There can be any other such critical components that can be placed inside the vault 2.

For restricted access to the vault 2, so as to safeguard such critical components a locking means 3 to lock the vault is also provided. The locking means 3 can be a mechanical lock operable by mechanical key, an electronic lock operable by electronic key, or a biometric lock operable by biometrics of authorized personnel, or any combination of them. The electronic lock can be based on RFID, QR code, etc. It is pertinent to be noted that there can be any other form of locking mechanism used such as which requires a two-factor authentication mechanism, in which one of the factors is randomly generated using a random number generation algorithm, and communicated to the authorized personnel in real-time and is valid for a small periodof time, for example 120 seconds.

Figure 3:
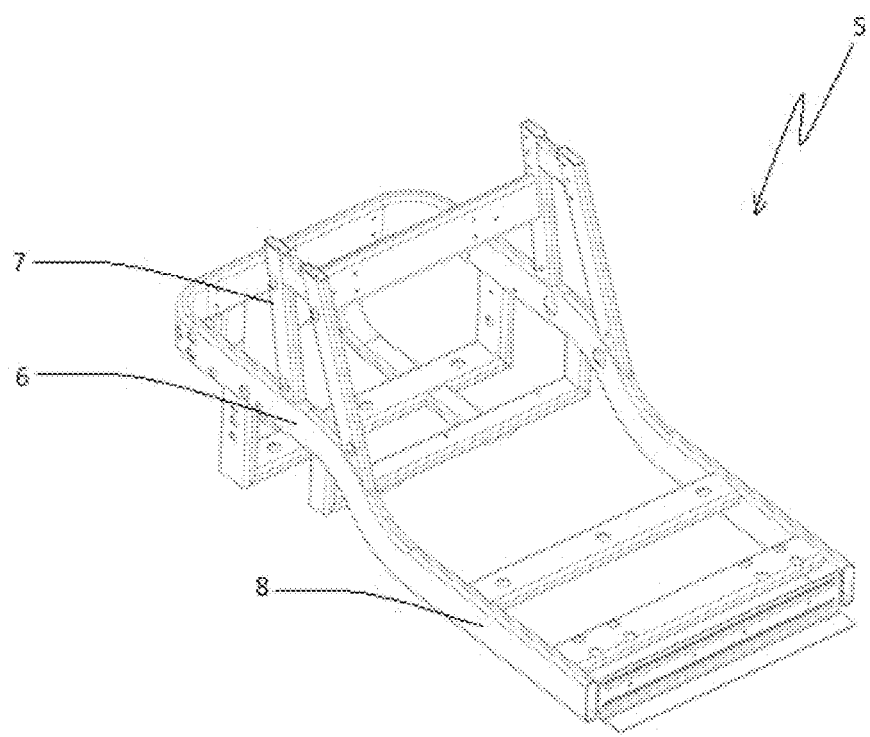
FIG. 3 illustrates a frame assembly of the wheelchair.
Figure 4:
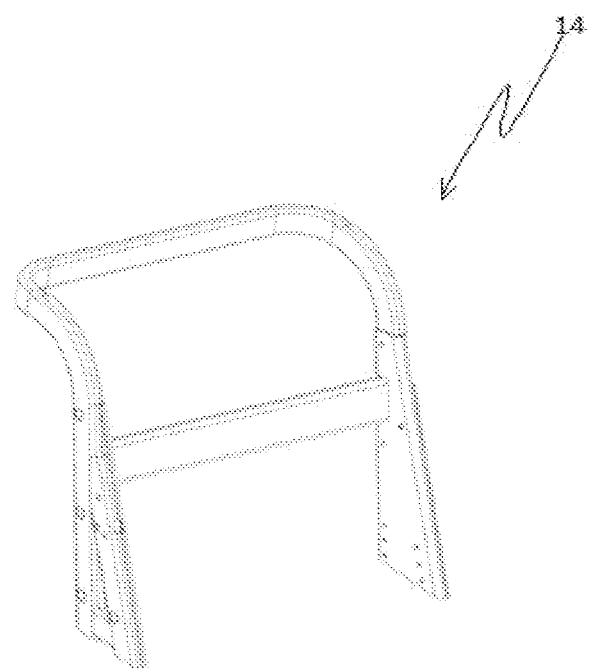
FIG. 4 illustrates a handlebar assembly of the wheelchair.

As shown in FIGS. 3 and 4, the vehicle 1 is assembled on a two-frame construction, a base frame 5, and a handlebar frame 14. An exemplary structure of the base frame 5 is shown in FIG. 3, and an exemplary structure of the handlebar frame 14 is shown in FIG. 4.

As shown in FIGS. 1 and 2, the wheels 23 of the vehicle 1 are assembled onto the base frame and the base frame further includes a base portion 6 and an extending portion 7 extending from the base portion 6, such that the part of the extending portion 7 and a cover 13 forms the vault 2. The extending portion 7 has a seat fixture utility 26 through which a seat 4 is affixed. This seat fixture utility 26 is provided above the vault 2. This is pertinent to be noted that the current provision of vault 2 is just an example, and there can be other ways to provide the vault 2, such as providing a box-like structure just fixed below the seat 4. Also, it is to be noted that in another exemplary embodiment, the vault 2 may not be placed below seat 4 and accessible from front, rather it can be placed behind the seat 4.

The handlebar frame is connected to the extending portion 7 of the base frame and has a backrest assembly through which a backrest 15 is mechanically coupled. The handlebar frame further includes one or more armrest assemblies through which one or more armrests 16 are mechanically coupled. One of the armrests 17 can swivel. The swivel armrest 17 is provided on the left-hand side of the vehicle 1, so as to allow for passenger ingress and egress the vehicle 1.

An interactive display 18 is also provided that is mechanically coupled to one of the armrests 16, and functionally coupled to one or more of the automation components placed inside the vault 2 to receive one or more data. This interactive display 18 can show the data on the display, or process the data and show the processed data on the display, or receive a display input from an input module associated with the display and process the data based on the received display input and to show the processed data onto the display. The interactive display 18 shows various data to the user including an indoor map showing the current and target location, flight details and status, concession stands, restroom facilities, baggage claim, and the like. The interactive display is provided along with the armrest on which the joystick/control input module 20 is installed. This ensures that the dominant arm has access to the touch interactive display 18.

While the figure shows that the interactive display 18 is on the right and the swivel armrest 17 is on the left, having these two swap locations is also feasible.

The control input module (joystick) 20 receives control input related to the direction of movement of vehicle 1, speed of movement of vehicle 1, or braking of vehicle 1, and sends the control input to the computing processor, such that the computing processor can process it, and trigger the motor controller for controlling the movement of the vehicle 1. In one embodiment, a separate computing processor is not used, and the control input is directly sent to the motor controller to help control further movement of the vehicle 1. In one embodiment, where the vehicle 1 is completely automatic, such a control input module may not be required.

In furtherance, an emergency button 19 is provided that is mechanically coupledto the armrest 16 onto which interactive display 18 and joystick 20 is coupled. The emergency button 19 is functionally coupled to the computing processor, such that the computing processor can process stop input received on the button 19, and sends a trigger to the motor controller for stopping the vehicle 1. In one embodiment, a separate computing processor is not used, and the stop input is directly sent to the motor controller that processes and stops further movement of the vehicle 1. The Emergency button 19 serves to stop the vehicle when in autonomous movement.

The first luggage compartment 9 for luggage is provided under the seat 4, which provides for additional space for keeping some hand baggage. It is part of the extended front portion 8 of the base frame. One or more base plates are assembled onto the extended front portion 8, such that a part of the extended front portion 8 is lying beneath the seat 4 and forms the first luggage compartment 9.

The base frame has a second luggage compartment 11 towards the rear. The second luggage compartment 11 for luggage is provided in the rear of the vehicle 1, such that the load is borne by the wheel axle. Additionally, the placement of the luggage will not impact the stability of the vehicle 1. This compartment 11 is enabled to keep luggage sizes up to 25"×18"×11". In one embodiment, only one of the luggage compartments 9, 11 may be provided. Or in another scenario, where the personal mobility vehicle 1 is used in other public places where commuters do not ordinarily travel with luggage, none of the luggage compartments 9, 11 may be provided.

The extended front portion 8 has a set of front sensors 10 placed onto a front side which sense distance to obstacles during forward movement of the vehicle 1 and to generate the distance data and send it to the computing processor, such that the computing processor can process it, and trigger the motor controller for managing movement of the vehicle 1. In one embodiment, a separate computing processor is not used, and the distance data is directly sent to the motor controller to help decide further movement of the vehicle 1. In one embodiment, where the vehicle 1 is driven using manual inputs, such front sensors 10 may not be required.

One or more of the front sensors 10 are also placed toward the right side (not shown) and one or more of the front sensors 10 are placed on the left side of the extended front portion 8 in proximity to the front side.

Sensors 10 placed on the extended portion 8 of the vehicle 1 in the front sense distances to obstacles during forward movement with the placement such that there is complete coverage of the front and sides. It is pertinent to be noted that the number of sensors 10 required are decided based on the available computational power and required coverage in the front side. Accordingly, placement of the sensors 10 on the front side can vary.

The second luggage compartment 11 has a set of rear sensors 12 placed towards skirt of the vehicle 1, which senses the distance to obstacles during backward movement of the vehicle 1 and generates the distance data and sends it to the computing processor, such that the computing processor can process it, and trigger the motor controller for managing movement of the vehicle 1. In one embodiment, a separate computing processor is not used, and the distance data is directly sent to the motor controller to help decide further movement of the vehicle 1. In one embodiment, where the vehicle 1 is driven using manual inputs, such rear sensors 12 may not be required.

One or more of the rear sensors 12 are also placed toward the right side (not shown) and one or more of the rear sensors 12 are placed on the left side of the second luggage compartment 11 in proximity to the skirt of the vehicle 1.

Sensors 12 placed onto the second luggage compartment 9 helps to sense obstacle distances when in reverse movement such that there is complete coverage of the rear and sides.

Sensors 10, 12 used include ultrasonic sensors, time of flight sensors, depth cameras, and monocular color cameras.

There is an extended sensor 21 which is additionally provided. This extended sensor 21 is mechanically coupled to a flagpole 25 of the vehicle. In an alternate embodiment, this extended sensor 21 can be placed on any fixture mechanically coupled to the vehicle 1 such that the sensor 21 is placed above the head of a person sitting onto the seat 4 of the vehicle 1. This extended sensor 21 captures an all-around view of the environment in which the vehicle 1 is placed, and sends the captured view to the computing processor such that the computing processor can process it, and trigger the motor controller for managing movement of the vehicle 1. In one embodiment, a separate computing processor is not used, and the distance data is directly sent to the motor controller to help decide further movement of the vehicle 1. In one embodiment, where the vehicle 1 is driven using manual inputs or where such an all-around view of the environment is not required, such extended sensors 21 are not provided.

A seatbelt 22 and seat arrangement are also provided that ensures the safety of the passenger driving the vehicle 1. The control system on the vehicle 1 will allow the vehicle 1 to be operable only when both the seating sensor 27 and seat belt sensor 24 are plugged in. The seat belt sensor 24 senses the wearing of a seat belt 22 of the vehicle 1, and generates and sends a wearing input to the computing processor. The seating sensor 27 senses seating of a person onto the seat 4, and generates and sends a seating input to the computing processor. The computing processor receives and processes the wearing input and the seating input to control the movement of the vehicle 1. This shall ensure that the vehicle 1 is operable only when a person is seated safely. Alternately, if the vehicle 1 is being deployed autonomously (without a person seated), if the seat weight sensor determines that a person is seated or if the seat belt sensor 24 changes values, the vehicle 1 ceases to operate autonomously.

The frame 5, 14 of the vehicle 1 is built with an Aluminum alloy for robustness and to minimize the weight of the vehicle 1. The base frame 5 is shown in FIG. 3. The handlebar assembly 14 is also made from an aluminum alloy which is shown in FIG. 4. These structures can be made of any other material that is light and durable. Further, the handlebar assembly 14 and the base frame 5 that are individually welded can be separated to enable a more volumetrically efficient packing and storage solution.

The other non-structural parts are manufactured with a glass-filled nylon plastic, or any other low-weight material, to critically manage the weight of the product. Specifically, the footrest, primary and secondary luggage racks, sensor housings, display housing, and cosmetic shells are all designed with plastic.

LIST OF REFERENCE SIGNS

1. Personal Mobility Vehicle
2. Vault
3. Locking means
4. Seat
5. Base frame
6. Base portion
7. Extending portion
8. Extended Front portion
9. First luggage compartment
10. Front sensors
11. Second luggage compartment
12. Rear Sensors
13. Cover 14. Handlebar frame
15. Backrest
16. Armrest
17. Swiveling armrest
18. Interactive display
19. Emergency button
20. Control input module/joystick
21. Extended sensor
22. Seat belt
23. Wheels
24. Seat belt sensor
25. Flagpole
26. Seat fixture utility
27. Seating sensor

The invention claimed is:

1. A personal mobility vehicle, comprising:
a base frame onto which two or more wheels of the personal mobility vehicle are assembled, wherein the base frame comprises a base portion and an extending portion extending from the base portion, such that a part of the extending portion and a cover form a vault;
wherein the base frame, and a handlebar frame are assembled to form the personal mobility vehicle, wherein the handlebar frame and the base frame, that are individually welded, are separated to enable a more volumetrically efficient packing and storage solution of the personal mobility vehicle, wherein the handlebar frame is connected to the extending portion of the base frame and is coupled with a backrest;
a locking means adapted to lock the vault, wherein the vault is located underneath a seat, wherein the locking means comprises at least one of: a mechanical lock operable by a mechanical key, an electronic lock operable by an electronic key, and a biometric lock operable by biometrics of an authorized personnel;
wherein the locking means requires a two-factor authentication mechanism, in which one of a factor is randomly generated using a random number generation algorithm, and communicated to the authorized personnel in real-time and is valid for a period of time.

2. The personal mobility vehicle according to the claim 1, wherein an interactive display shows various data to a person including an indoor map showing a current and target location, flight details and status, concession stands, restroom facilities, and baggage claim.

3. The personal mobility vehicle according to the claim 1, wherein the extending portion has a seat fixture utility through which the seat is affixed, the seat fixture utility is provided above the vault.

4. The personal mobility vehicle according to the claim 1, wherein the base frame has an extended front portion, wherein one or more base plates can be assembled, such that a part of the extended front portion is lying beneath the seat and is adapted to be used as a first luggage compartment.

5. The personal mobility vehicle according to the claim 4, wherein the extended front portion comprises a set of first sensors placed onto a front side, and adapted to sense distance to obstacles during forward movement of the personal mobility vehicle and to generate a distance data and adapted to send it to an interactive display.

6. The personal mobility vehicle according to the claim 5, wherein the set of first sensors is placed toward sides of the extended front portion in proximity to the front side.

7. The personal mobility vehicle according to the claim 1, wherein the base frame has a second luggage compartment towards a backside of the personal mobility vehicle, such that a load is borne by the two or more wheels.

8. The personal mobility vehicle according to the claim 7, wherein the second luggage compartment comprises a set of rear sensors adapted to sense distance to obstacles during backward movement of the personal mobility vehicle and to generate a distance data and adapted to send it to an interactive display.

9. The personal mobility vehicle according to the claim 8, wherein the set of rear sensors is placed towards sides of the second luggage compartment in proximity to a skirt of the personal mobility vehicle.

10. The personal mobility vehicle according to the claim 1, wherein the handlebar frame and the extended frame are made from aluminum alloy for robustness and to minimize a weight of the personal mobility vehicle.

11. The personal mobility vehicle according to claim 1, wherein the handlebar frame is mechanically coupled with one or more armrests, wherein the one or more armrests helps in the ergonomic placement of arms onto the personal mobility vehicle.

12. The personal mobility vehicle according to the claim 11, wherein the one or more armrests is adapted to swivel, wherein swiveling of the one or more armrests helps in displacement of the one or more armrests during ingress and egress from the seat of the personal mobility vehicle.

13. The personal mobility vehicle according to the claim 11, comprising:
an interactive display mechanically coupled to the one or more armrests, and performs at least one of:
show data onto the interactive display,
process the data and show the processed data onto the interactive display,
receive a display input from a control input module associated with the interactive display, process the data based on the received display input and show the processed data onto the interactive display.

14. The personal mobility vehicle according to the claim 11, comprising:
an emergency button mechanically coupled to the one or more armrests to stop the personal mobility vehicle based on a stop input.

15. The personal mobility vehicle according to the claim 11, comprising:
a control input module adapted to receive a control input related to at least one of; direction of movement of the personal mobility vehicle, speed of movement of the personal mobility vehicle, braking of the personal mobility vehicle or combination thereof, to control the movement of the personal mobility vehicle based on the control input.

16. The personal mobility vehicle according to the claim 1, comprising:
an extended sensor mechanically coupled to the personal mobility vehicle such that the extended sensor is placed above head of a person sitting onto the seat of the personal mobility vehicle and adapted to capture all around view of an environment in which the personal mobility vehicle is placed and to send the captured view to the interactive display.

17. The personal mobility vehicle according to the claim 1, comprising:
a seat belt sensor adapted to sense wearing of a seat belt of the personal mobility vehicle, and to generate and send a wearing input to the personal mobility vehicle, and
a seating sensor adapted to sense seating of a person onto the seat, and to generate and send a seating input to the personal mobility vehicle.

18. The personal mobility vehicle according to claim 16, wherein the extended sensor is mechanically coupled to a flagpole of the personal mobility vehicle.

\* \* \* \* \*